United States Patent [19]

Steinmann

[11] Patent Number: 5,034,902
[45] Date of Patent: Jul. 23, 1991

[54] METHOD AND SYSTEM FOR ASCERTAINING THE CONSUMPTION HABITS OF A TEST POPULATION

[75] Inventor: Matthias Steinmann, Konolfingen, Switzerland

[73] Assignee: SRG Schweizerische Radio-und Fernsehgesellschaft, Berne, Switzerland

[21] Appl. No.: 546,706

[22] Filed: Jul. 2, 1990

Related U.S. Application Data

[63] Continuation of Ser. No. 397,349, Aug. 23, 1989, abandoned, which is a continuation of Ser. No. 12,424, Feb. 9, 1987, abandoned.

[30] Foreign Application Priority Data

Dec. 9, 1986 [AT] Austria ................. 3265/86

[51] Int. Cl.⁵ .................. H04N 7/00; H04B 17/00
[52] U.S. Cl. .................. 364/550; 358/84; 455/2; 379/92
[58] Field of Search ........... 364/550, 551.01, 406; 358/83-85, 335; 377/13; 379/92, 93, 107; 455/2

[56] References Cited

U.S. PATENT DOCUMENTS

| | | | |
|---|---|---|---|
| 4,044,376 | 8/1977 | Porter | 358/84 |
| 4,170,782 | 10/1979 | Miller | 379/92 X |
| 4,388,644 | 6/1983 | Ishman et al. | 455/2 X |
| 4,566,030 | 1/1986 | Nickerson et al. | 455/2 X |
| 4,578,700 | 3/1986 | Roberts et al. | 379/92 X |
| 4,622,583 | 11/1986 | Watanabe et al. | 358/84 |
| 4,630,108 | 12/1986 | Gomersall | 455/2 X |
| 4,642,685 | 2/1987 | Roberts et al. | 455/2 X |
| 4,654,482 | 3/1987 | DeAngelis | 379/93 X |
| 4,665,516 | 5/1987 | Middleton et al. | 379/93 X |
| 4,677,466 | 6/1987 | Lert, Jr. et al. | 358/84 |
| 4,686,564 | 8/1987 | Masuka et al. | 358/84 X |
| 4,697,209 | 9/1987 | Kiewit et al. | 358/84 |
| 4,710,929 | 12/1987 | Kelly et al. | 379/93 X |
| 4,723,302 | 2/1988 | Fulmer et al. | 358/84 X |
| 4,734,792 | 3/1988 | Maeda et al. | 358/335 |
| 4,745,468 | 5/1988 | Von Kohorn | 358/44 |
| 4,750,034 | 6/1988 | Lem | 455/2 X |
| 4,764,808 | 8/1988 | Solar | 358/84 |
| 4,792,864 | 12/1988 | Watanabe et al. | 358/84 X |
| 4,885,632 | 12/1989 | Mabey et al. | 358/84 |
| 4,905,080 | 2/1990 | Watanabe et al. | 358/84 |
| 4,912,552 | 3/1990 | Allison et al. | 358/84 |
| 4,967,273 | 10/1990 | Greenberg | 358/84 |

FOREIGN PATENT DOCUMENTS 2622970 12/1976 Fed. Rep. of Germany .
2404074 8/1985 Fed. Rep. of Germany .

OTHER PUBLICATIONS

"MeBlatte am TV-Programm", Funkschau, 19/1985, pp. 39-44, (no translation).

Primary Examiner—Joseph L. Dixon
Attorney, Agent, or Firm—Marks Murase & White

[57] ABSTRACT

A method and system for determining the television consumption habits of a test population by obtaining data relating to the program being viewed and/or recorded and transmitting the data through telephone connection to a central computer for evaluation. The data is obtained in a manner which enables the elimination of intervention or supervision by specialized person in the data acquisition process. Any data that is not decoded or is decoded with uncertainty can be determined or verified by means of a dialog with the central computer.

10 Claims, 4 Drawing Sheets

METHOD AND SYSTEM FOR ASCERTAINING THE CONSUMPTION HABITS OF A TEST POPULATION

This application is a continuation of application Ser. No. 07/397,349, filed Aug. 23, 1989, which is a continuation of application Ser. No. 07/012,424 filed Feb. 9, 1987, both now abandoned.

BACKGROUND OF THE INVENTION

The present invention relates to a method and a system for ascertaining the consumption habits of a test population, and, more particularly the television consumption habits of a test population. Data regarding the habits, in particular, determination of the television channel, either by determining the program switched on and/or interrogation of the population, is automatically memorized in locally arranged apparatuses and the memorized data is preferably transmitted by telephone to a central computer for evaluation. Systems as described above are on the market from different sources and they are used in different countries, in particular for investigating the television consumption habits.

A first decisive object of such methods and systems relates to the reliable automatic determination of the television channel, respectively the program switched on. Published German application DE-OS 33 42 949 relates to a method of determining of the channel selection in a television receiver (TV-receiver). This known method presupposes that to each TV-receiver there is associated a locally arranged apparatus which has to determine from the tuning voltage which channel is witched on, respectively which channel is received. This known procedure presupposes an individual adaption of each single locally arranged TV-receiver and this not only at the time of the first installation of the apparatus but generally also at each modification of the transmitted frequencies and starting of new transmitters.

SUMMARY OF THE INVENTION

It is an object of the present invention to simplify the acquisition of data, more particularly the determination of the television channel, respectively the television program. Such a simplification may have the effect that the scope of seizable data can generally be enlarged. According to claim 1, the solution of this problem is a method which is characterized in that the data, more particularly the data of a television channel is acquired locally in a form which can be decoded directly by the central computer without preliminary local decoding, whereby preferably the carrier frequency is determined and whereby besides data relating to television channels, respectively television programs, preferably also data relating to video recording and reproducing, data relating to interactive modes between the local apparatus, respectively the central computer and test persons, data relating to teletext or video reception, data relating to computer games and data relating to other consumption habits is acquired and whereby preferably local data of accessory apparatuses is transmitted with a high frequency carrier through the supply mains to a principal apparatus connected to the central computer.

As already mentioned, the invention relates also to a system for carrying out the method according to the invention which system in accordance with claim 8 is characterized by switching means which are capable to effect the local acquisition of data, more particularly of data of a television channel, in a form which may be decoded directly by the central computer without preliminary local decoding, whereby preferably the carrier frequency is determined and whereby besides switching means for the determination of data regarding television channels, respectively programs, preferably also switching means are provided for the determination of data relating to interactive modes between the local apparatus, respectively the central computer and test persons, data relating to the reception of teletext or the reception of video, data relating to computer games and data relating to other consumption habits and whereby preferably switching means are provided for transmitting local data of accessory apparatuses with high frequency carrier through the supply mains to a principal apparatus connected to the central computer. Other objects of the invention and corresponding solutions are to be found in the dependent claims.

BRIEF DESCRIPTION OF THE DRAWINGS

The invention will be described further by way of example and by reference to the accompanying drawings in which.

DETAILED DESCRIPTION OF THE INVENTION

Figure 1:
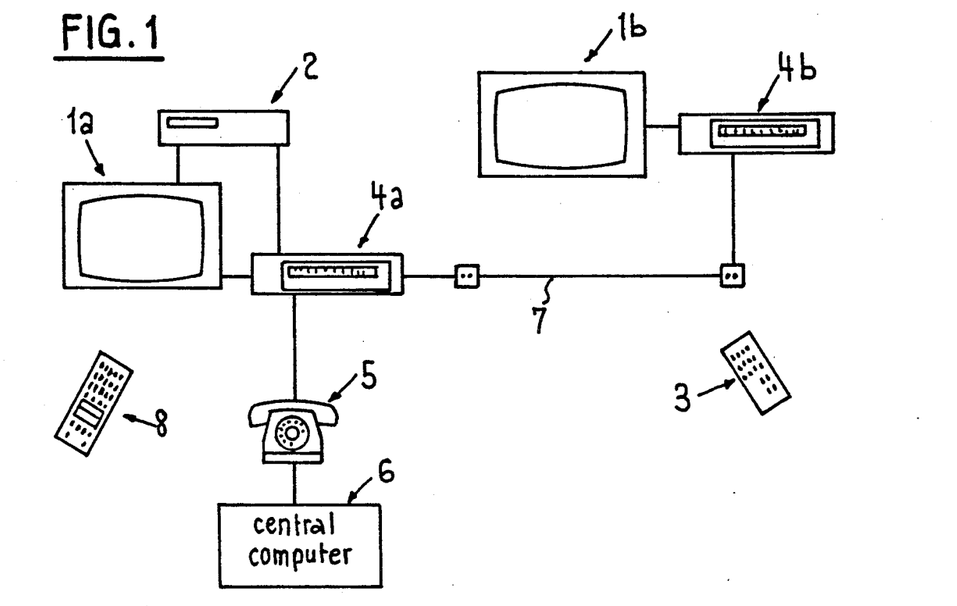
FIG. 1 depicts a schematic illustration of the apparatuses installed in a household.

FIG. 1 shows the apparatuses present in a household, in particular two TV-receivers 1a and 1b which are installed in different rooms. A video recorder (VCR) 2 is connected to the TV-receiver 1a. To each of the two TV-receivers 1a and 1b is associated a remote control manipulator 3, only one of which is illustrated in FIG. 1. A telecontrol apparatus (TCG) 4a is connected to the TV-receiver 1a and the VCR 2, and is also connected to a central computer 6 through the home telephone 5. A TCG 4b is connected to the TV-receiver 1b and is also connected by high frequency signals through the supply mains 7 to the TCG 4a. The apparatus of TCG 4b is different from the apparatus of TCG 4a in that it does not contain a module for connection to the telephone network. However, both apparatuses contain transmitting and receiving circuits for digital transmission of data from the apparatus 4b to the apparatus 4a, the release of the transmission coming from apparatus 4a. Finally, a remote control manipulator 8 is provided for each TCG 4a and 4b, only one of which is illustrated in FIG. 1. Both apparatuses 4a and 4b are provided with an electroluminescent display capable of displaying any ciphers, texts and symbols.

As described above, data relating to the use of the TV-receivers 1a and 1b as well as of the VCR 2, in particular data relating to the emissions television received at a determined time, to the emissions reproduced from the VCR or to personal recordings and the like is memorized in the apparatuses 4a and 4b. This data is periodically recalled by the central computer 6 from the apparatus 4a which also contains data memorized from apparatus 4b. The recalled data is then processed with data of many other households and centrally memorized.

A first central task of the illustrated system consists to determine correctly and in a simple manner the specific working of the system, in particular the specific television channel or program switched on. As mentioned above, it is of particular interest to achieve this determination largely independently from individual matching operations at the place of installation in the households. The determination must also be largely independent from the individual characteristics of different types of TV-receivers. To this end and in accordance with the present invention, one determines the carrier frequency of the TV-channel switched on, this frequency being fixedly allocated to this channel so that it characterizes this particular channel in a reliable fashion. However, it is also possible to take the digitally converted tuning voltage which drives the capacity dependent varicap diode as a characteristic and by means of interpolation, such as by systematic interrogation, to identify the channel in the central computer and also to classify correctly new or modified channel frequencies without any intervention in the households. This enables elimination of the checking and adaption of the apparatuses 4a and 4b in the households.

Figure 2:
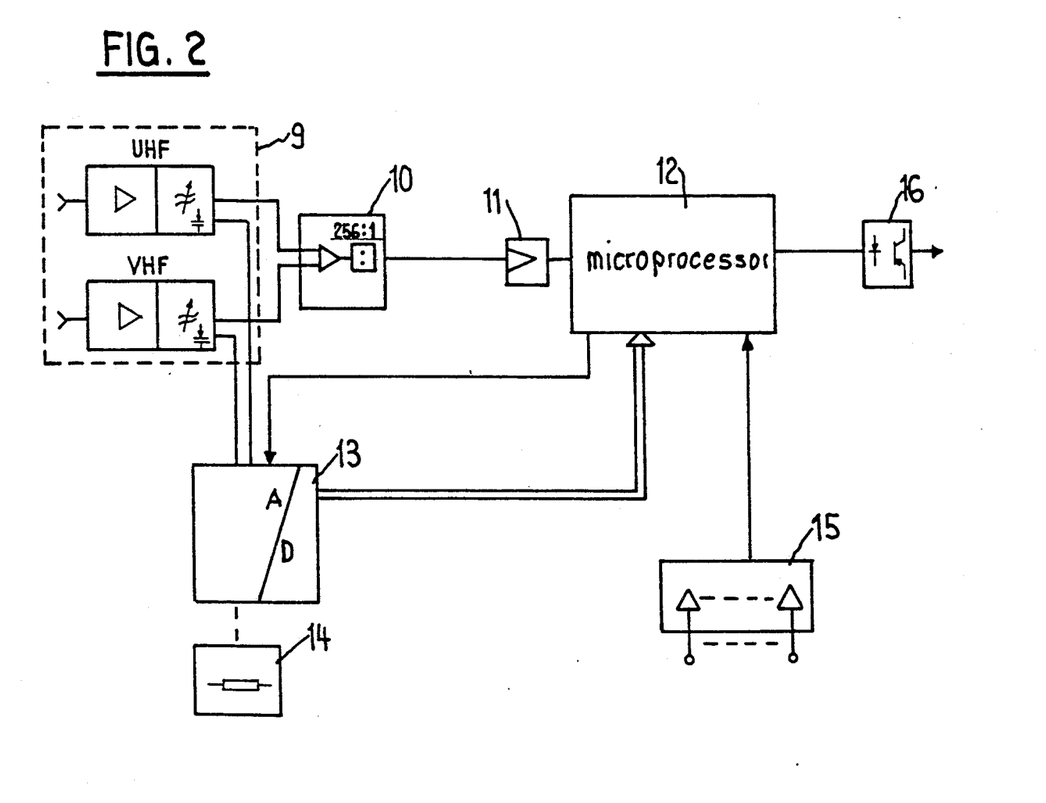
FIG. 2 depicts a block diagram of an adapter for the determination of channels.

FIG. 2 shows a digital adapter for the determination of the channel. The reference 9 designates the tuning circuit (tuner) for UHF and VHF. The input frequency is delivered to a microprocessor 12 through a broadband amplifier and frequency divider 10 as well as an interface 11. It is also possible, as an alternative, to deliver the tuning analog voltage to an analog interface 13 comprising a digital-analog converter having an associated calibration circuit 14. Further, a digital interface 15 is provided by means of which tuning information from the TV-receiver can be transmitted to the processor 12. The circuit of FIG. 2 also allows conversion into digital form of different types of specific information being finally delivered to the apparatus 4a from apparatus 4b through a master slave interface 16 (optocoupler). Preferably the carrier frequency of the received channel is used because this leads to the smallest probability of false interpolations. In the following are given some particular specifications of the circuit of FIG. 2.

The digital adapter shown in FIG. 2 can be used with practically all types of apparatuses in the field of entertainment electronics in which the information received in all frequency bands is recovered in accordance with the heterodyne principle. More particularly, it may be used in TV-receivers, video recorders and radio receivers. The digital adapter of FIG. 2 has the function to selectively determine the broadcast channels which are converted into images and sounds by the heterodyne principle in the above mentioned apparatuses. The digital adapter, integrated into the TCG system, gathers the data necessary for the recognition of the status condition for the public opinion survey. The digital adapter has basically three different ways of determination of the necessary data for ascertaining the consumption habits:

a) Measurement of the oscillator frequency: The oscillator frequency is measured in the range of 30 MHz to 1 GHz. The measured frequency is directly allocated to a given channel in accordance with the allocation B or G of the CCIR Standard.

b) Analog determination: The adapter may also determine analog measured values or logic conditions which come from the receiving part or the processing part of the apparatuses and assign them to a determined output value.

c) Sequential data determination: The adapter is capable of determining and analysing sequential signals on narrow bus systems in the digital part of the apparatuses. Bit sequence frequencies up to 40 KBits are possible.

The digital adapter contains a high speed microprocessor system. At its periphery are provided three converter systems for analog-digital signal processing:

a) Measurement of the oscillator frequency: At immediate proximity of the tuning unit is installed the high sensitive HF-broadband amplifier 10 which is coupled with the oscillator portion of the tuner 9 by means of an exposed probe. The oscillator signal is received through HF-transparent places in the tuner housing, amplified and delivered to the processor 12 after analog-digital conversion. The processor 12 acts as a frequency measuring device and it can recognize the selected channel in the receiver. The execution of the HF-amplifier 10 allows recognition of the VHF and UHV frequencies in the tuner 9.

b) Analog input system: The analog inputs are delivered to the processor 12 through an analog-digital converter (AD-converter) 13 and a multiplex system. An input is specially provided for the determination of the tuning voltage of the varicap diode. Six inputs serve to the determination of the threshold values of status signals.

c) Digital determination: Different inputs serve to direct parallel or sequential data recognition. Depending on the software utilized, synchronous or asynchronous data streams may be determined and analysed. The input functions of the adapter are filtered digitally and the data obtained is formatted to be system adapted and the programs of utilization of the adapter may be individually prepared or partially recalled from read-only memories.

Whatever the manner of channel determination is used, the central computer can decode directly the digital information received. All specific data relating to the channels is memorized in the computer and the channel received is identified by comparison of its characteristic data with the data memorized. If an information is missing in the memory, it is possible to interrogate the viewer from the central computer. In this case, a question such as "are you looking at channel X ?" appears on the TCG where channel X corresponds either to a new channel or to an already existing channel the frequency of which has been changed. The answer "yes" confirms the assumption and the new data can be memorized and assigned to the new or modified (frequency) channel. There exists in this respect even the possibility to detect false indications made by the viewer, such indications leading to particular conclusions.

Figure 3:
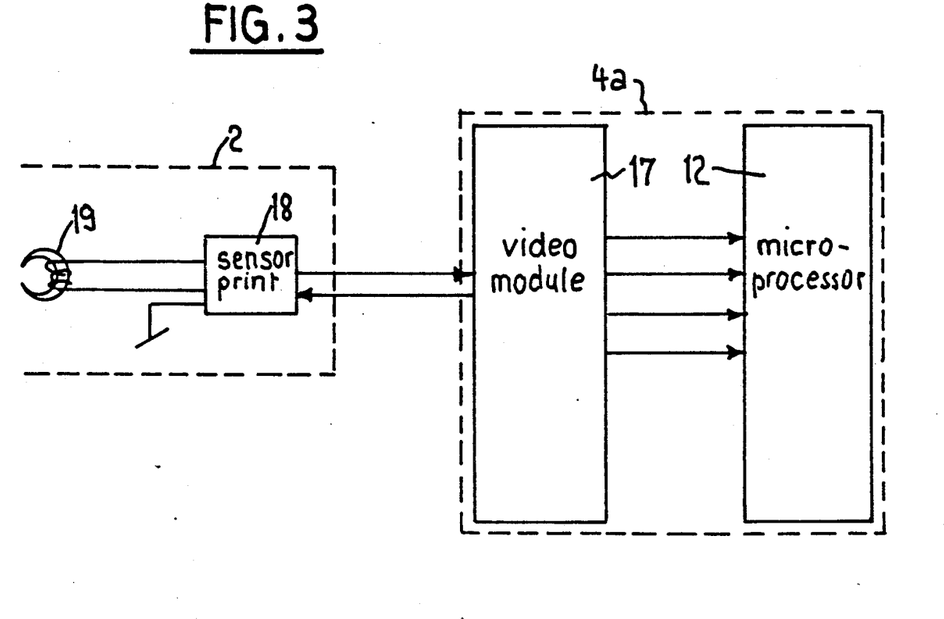
FIG. 3 depicts a circuit for determination of data relating to the use of a video recorder.

As mentioned, it is desirable to obtain information about the use of the video recorder (VCR). FIG. 3 shows a block diagram of the essential circuits for the determination of data relating to the use of the VCR. A video module 17 is contained in the TCG 4a, this module being connected to the processor 12 through a bus system. The video module 17 is also connected in the VCR to a sensor print 18 which is itself connected to the CTL-head 19 (CTL is the track on the tape according to American National Standard) of the VCR. The particular specifications are as follows:

The video module 17, as a subsystem of the TCG 4a, makes possible data recording and reproducing. It is limited to the normalized VHS and Betamax systems. At the time of recording, the data is magnetically registered on the video tape and it can be read again at the time of reproducing without any interference for the user. The system has no qualitative influence on the recording of image and sound.

All VHS and Betamax type video recorders may be equipped for data recognition with the video module 17. The CTL-head synchronization has been choosen as a system constant for possibility of modulation. The mounting of the video module 17 is very simple because it necessitates only a 2-wire connection to the audio head. In addition, an adapter is mounted for the channel voltage, on-off and determination of the play condition. The CTL track contains the synchronization for the rotating video head. Needle pulses synchronous with the beginning of the image are recorded on the track, these pulses allow stabilization of the image at the time of reproduction. The video module 17 allows data to be recorded between the synchronization pulses on the bearing medium. The transmission of data is effected sequentially at 1 bit per image. The maximum data transmission rate is therefore 30 bits/sec. The video module 17 contains a microprocessor 12 which takes the data sequentially from the TCG 4a and records it sequentially on the tape.

The sensor print 18 is a bidirectional analog amplifier. The inputs are connected directly to two taps of the recording and reproducing CTL-head. The input signal is delivered through a magnetic coupling device to the amplifier without DC component. Input and output signals are separated from each other by a circulator. The differences in the levels of the input signals permits the system to automatically recognize the recording and reproducing modes of the VCR. Further, the dynamics of the system is reduced to a minimum value by means of a keyed regulation and filter components.

The video module 17 comprises a microprocessor 12 which processes the signals read in accordance with determined filtering methods for gathering data. At the time of recording in the VCR, the microprocessor 12 synchronizes to the vertical synchronization pulses and modulates sequentially a data stream in the intervals between the vertical blanking pulses. The microprocessor 12 can reproduce with accuracy and reliability the registered data. Distorsions in the duration of the period of the vertical blanking pulses are automatically corrected by the processor. Also normal and slow speeds of the tape are automatically determined and controlled by the system.

Figure 4:
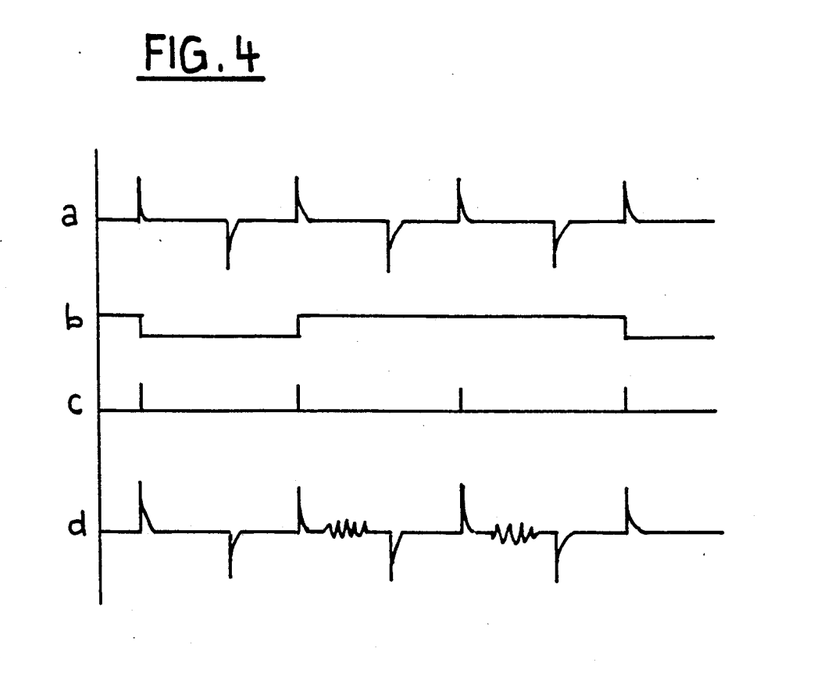
FIG. 4 depicts a pulse diagram illustrating the operation of the circuit of FIG. 3.

The CTL recording track is used for synchronizing the driving system to the image frequency (beginning of the image). This signal is delivered to the recording head through a differentiator. It becomes in this way a system specific norm. FIG. 4 shows:

a) the differentiated signal at the time of recording. During reproducing, one obtains the same signal but at a 60 dB smaller level;

b) the digital data stream at the processor interface;

c) the data synchroniziong pulses determined by the digital processor filtering, and d) a data modulated CTL-signal (the burst after the positive peaks represents a logic 1).

It is also possible to determine data relating to the sort of the emission and to the time of its recording and reproducing, to memorize this data and to transmit it to the central computer. It is also possible to determine if recorded television emissions, purchased video tapes or self made video records are played. This determination is made in accordance with the above described dialogue method. If the computer determines that data related to a video reproduction does not correspond to a television channel or program, an interrogation by means of the display of the TCG about the type of video record which is viewed may take place.

For the media and market research, it is desirable to determine in addition if teletext is viewed and which pages of teletext are viewed. One has also to determine when and which page of teletext is selected. However, due to the fact that many teletext decoders of the TV-apparatuses offer the possibility to lay down pages of the teletext in a memory without to display them on the TV-screen, it was necessary to develop a special adapter. This adapter decodes the code (page number) from the RGB (red, green, blue) color signal or the blanking signal shortly before the CRT (cathode ray tube). This permits recognition of the code (page number) of the page of the teletext which is effectively displayed.

The image content of a page of teletext is read in in a digital memory with a sample frequency of 6 MHz. The initial instruction is given by the processor 12 after the processor 12 has determined through a teletext status input that teletext is switched on. The 6 MHz clock frequency is taken from the teletext decoder in the TV-apparatus so that the samples which are read in correspond to the points of the image that are used by the teletext decoder for the display of signs. The start for the read in cycle is associated with the image and line synchronization pulses in order to ensure that a full image is read in in correct synchronism. The image is memorized line by line. In order for each sample to receive an address in the memory, the clock frequency of 6 MHz drives an address counter which at the time of read in takes over the RAM-addressing. The clock frequency is suppressed during the duration of the lines synchronization pulses in order not to occupy unnecessary necessary space in the memory. An additional enable input at the clock connection permits starting and stopping the clock at any place on the lines of the image. This permits reading in only determined portions of an image.

If an image is memorized, the processor 12 can select each individual point and after calculation of the addresses it can sum up all related points again in form of a matrix according to the teletext norm. This renders it possible to recognize the page number on the heading line of the teletext or other optional page marks and to transfer them to the TCG for evaluation. It is also possible to decode any bit sequence of a line.

As mentioned, it is possible and desirable to further determine data relating to the consumption habits and to transfer it to the central computer. Today, a high percentage of products are provided with indications in the UPC (Universal Product Code) code so that it is possible to give to the consumer an UPC scanner with which he can read the UPC code on the envelope or the casing of the purchased goods and transfer this code in the TCG through an appropriate adapter. Further indications may be given by means of the remote control manipulator 8. Correspondingly, data may also be determined at selling points which permits research about the consumer comportment.

The auxiliary device for reading the UPC code is preferably designed for being fed by the supply mains and for transmitting the data determined by high frequency through the supply mains to the TCG as previously described. This UPC scanner for reading data may be installed at any place in the household for determination of data such as in the kitchen. It may also be provided with a key board for entry of data that is not automatically readable. Other data may also be entered either by scanning of tables with UPC code or entered manually, e.g. data over reading of newspapers periodicals, radio listening and other habits.

Different modifications are possible, whereby systems in different steps of completion may be used. It is, for example, possible to use more than two secondary apparatuses 4b. With respect to the present invention it can be seen that in all cases data has to be determined from broadcast channels by means of emissions while all other data acquisition required about the use of the video recorder or about information from the teletext or from the central decoding of data, may be by means of dialogue. All of these different modifications individually have inventive signification and must be independently protected.

Figure 5:
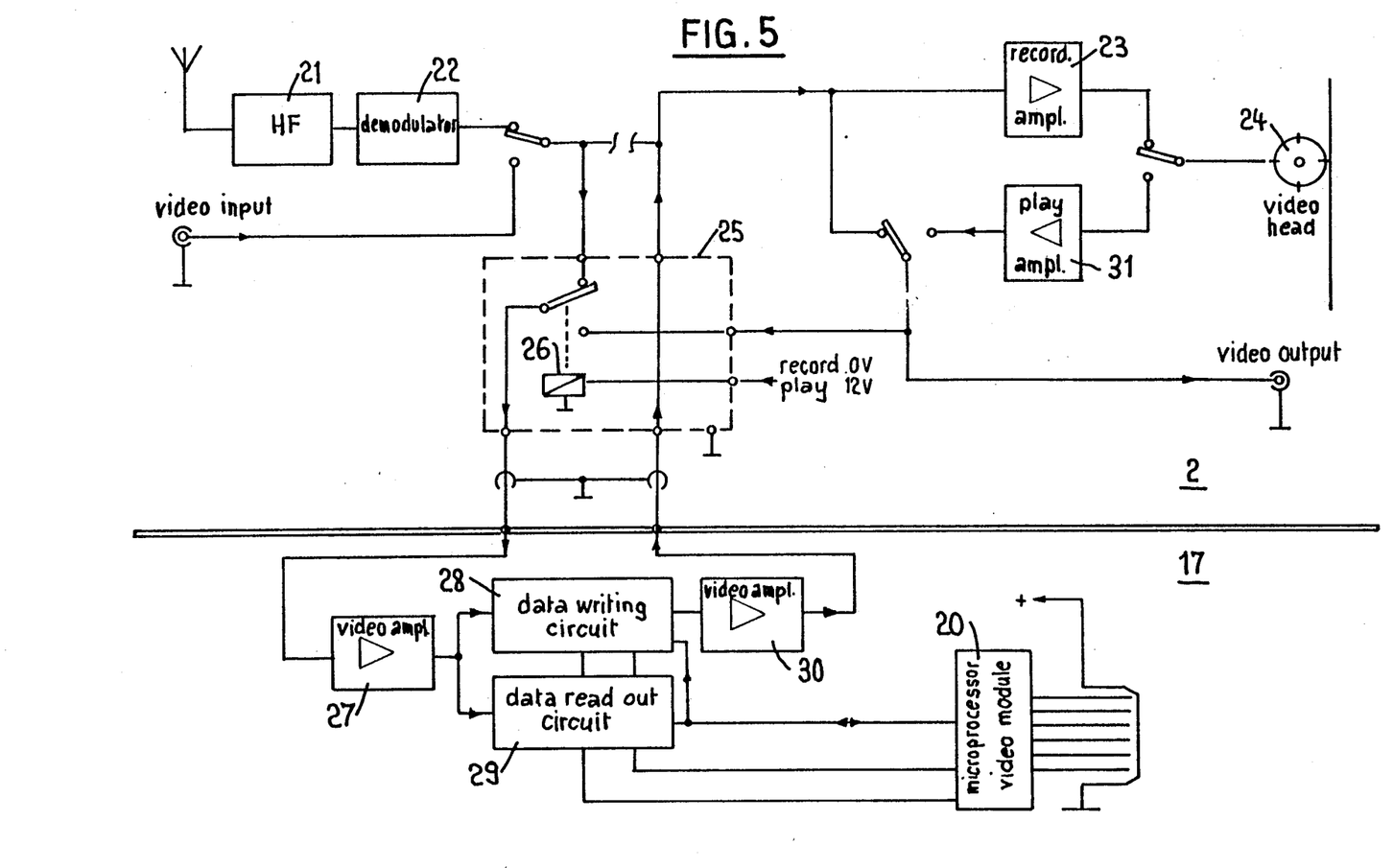
FIG. 5 depicts a block diagram of a variant of the video module for integration of data in the video signal.

It has been shown above that all VHS and Betamax type video recorders may be equipped for data identification with the video module 17. FIG. 5 shows a block diagram of a variant of the video module for integrating data not as previously in the CTL track but in the video signal before its recording and for recording this signal on the video tape in the image track.

The data to be written in the video signal is the following:

| | |
|---|---|
| channel number | 1 byte |
| local time | 3 byte |
| date | 3 byte |
| check sum | 1 byte |
| total | 8 byte per frame |

Figure 6:
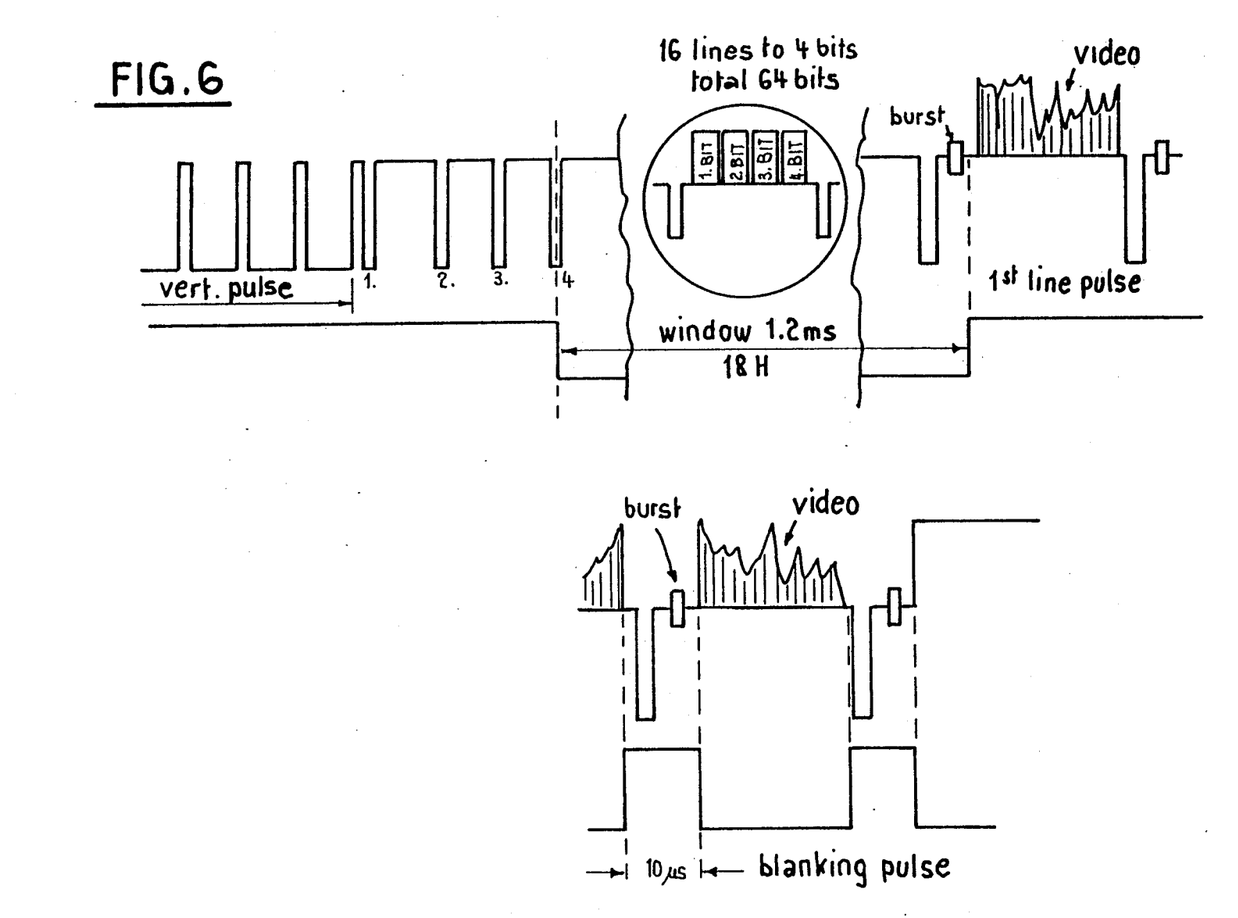
FIG. 6 depicts a pulse diagram illustrating the conditions in which the integration of FIG. 5 takes place.

One sees that the information to be introduced comprises 8(byte)×8 bits=64 bits. This information is to be written in the first 16 lines of each frame of the video signal which means that each line receives 4 bits. These conditions are illustrated in FIG. 6.

The first lines of each frame of a video signal received from a TV-transmitter do not comprise an image content but rather data relating to teletext, vertical pulse synchronization (VPS) and special transmitter identification signals. In the case of recording this video signal on a video tape, this data from the transmitter is not considered. The VPS data is only necessary for the precise starting and stopping of a video recording. Instead of the data comprised in the video signal from the transmitter and relating to the teletext, VPS and transmitter identification, the video module of the present invention permits introduction into the video signal of other data such as transmitting channel number, time and date of the transmission, without disturbing the normal working of the video recorder or of the TV-installation.

The precise timing relations for introducing data in the video signal is controlled by a microprocessor 20 of the video module 17 in such a way that the normal operation of the video recorder 2 is not disturbed. Also, the content of the image is not affected. FIG. 5 shows that the video signal to be recorded is recovered from the TV-signal after this TV-signal which is received on the antenna has been amplified in the HF portion 21 of the TV-receiver and demodulated in the demodulator 22. Normally, if the video signal did not have to be provided with data before its recording, this video signal would be amplified in a recording amplifier 23 and delivered to the video head 24 for recording. However, in the present case, the direct connection between the demodulator 22 and the recording amplifier 23 is interrupted and the demodulated video signal is delivered to a video switching module 25 of the video recorder 2. The video switching module comprises essentially a relay 26 with a SPDT contact arrangement. The video signal in which data is to be written is delivered by the video switching module 25 to a video amplifier 27 which in its turn delivers the video signal further to a writing circuit 28 in which the above mentioned data is written on the first 16 lines of each frame and at the same time to a reading circuit 29 in which the data recorded on the video tape is recovered. The output of the circuit 28 is delivered through a video amplifier 30 to the video switching module 25 which is connected to the recording amplifier 23. The data to be written in the video signal is provided to the circuit 28 by the microprocessor video module 20 which is connected to the TCG print.

If the VCR-adapter and the TCG determine that the video recorder 2 has been switched on the recording made, the video module 17 receives an enable signal and synchronizes itself on the vertical and horizontal synchronization pulses of the video signal to be recorded. The video signal is also blanked out by means of blanking synchron pulses and clamping pulses in such a way that these values are not modified by the video module 17. The data on the first 16 lines of each frame for VPS, teletext, and the like is overwritten by the above mentioned data (channel number, time, date).

If the video recorder is switched on the reproduction mode, the video signal from the head 4 is delivered to the video switching module through the play-amplifier 31 and from the video switching module through the video amplifier 27 to the reading circuit 29. The video module 17 is synchronized to the video signal so that the data written may be read each time the cassette is reproduced. The data from the circuit 29 is delivered through the microprocessor 20 to the TCG-apparatus for displayed.

We claim:
1. A method for determining the television and video comsumption habits of a test population which may receive, record and view video programs by means of a video receiver and a video recorder and display means associated with said video receiver and said video recorder for displaying video information, said method comprising the steps of:
producing data characterizing video programs received and recorded on said video recorder, the operating mode of said television receiver and the operating mode of said video recorder;
transmitting said data to a central computer for evaluation to determine the video comsumption habits of a test population;

transmitting interrogation data to and from said central computer to said display means for interrogation of said test population; and providing means associated with said video receiver and video recorder for transmitting data to said central computer; and transmitting replies to said interrogation data from users to said central computer wherein said interrogation data is evaluated at said central computer against stored data within said central computer to determine if further interrogation is required.

2. An apparatus for determining the television and video consumption habits of a test population comprising:

a television receiver;

a video recorder connected to said television receiver, said video recorder comprising:

a demodulator for demodulating received television signals;

a video input;

switch means for changing over from a record mode to a play mode, said switch means including a first switch selectively connectable to said video input through said demodulator;

a video module comprising data writing and data read out means;

said first switch being selectively connectable to an input of said data writing and data read out means for transmitting video signals thereto;

wherein an output of said data writing means is connected to a recording amplifier;

wherein a play amplifier is connected to said switch means and to said data read out means when said video recorder is in said play mode;

wherein characterizing data is added to a video signal being recorded during said record mode by said data writing means and said characterizing data is read out from said video signal in said play mode by said data read out means; and wherein said characterizing data read out from said video signal is sent to a control computer to determine the viewing habits of a test population.

3. An apparatus for obtaining information relating to the use of video equipment comprising:

detection means associated with said video equipment for detecting data characterizing use of said video equipment; and means for transmitting said detected data to a central processor means for processing said data to obtain information relating to the use of video equipment;

said central processor means comprising:

transmission means for transmitting interrogation data from said processor means to said video equipment;

said video equipment further comprising:

input means for enabling responses to said interrogation data to be transmitted to said central processor means;

wherein said central processor means further comprises interrogating means for interrogating a viewer in the event that said central processor means receives a transmission of said stored data not containing all of said characterizing data; and display means for displaying data from the central processor means for interrogating a viewer.

4. The apparatus of claim 3 wherein said detection means includes means for detecting universal product codes of products used by a viewer.

5. A method for obtaining information relating to the use of video equipment by a test population wherein said video equipment comprises video recorder means for reproducing and recording video programs, said method comprising the steps of:

recording, during video program recording, data characterizing the recorded program on a synchronization track of a video recording medium, including the steps of analyzing synchronization pulses occurring on said synchronization track; and recording said characterizing data between said synchronization pulses;

detecting, during video program reproduction, said recorded characterizing data to identify characteristics of said video programs;

storing said detected data;

transmitting said stored data to a central computer to obtain information relating to the use of video equipment by a test environment; and wherein said characterizing data is recorded at a first level and reproduced at a second level, and wherein differences in the levels of these signals are used to distinguish between video recording and video reproduction modes.

6. The method according to claim 5 wherein said characterizing data is recorded and reproduced at a level less than a level of the synchronization pulses.

7. An apparatus for obtaining information relating to the use of video equipment by a test population, said video equipment comprising video recording and reproducing means and video viewing means, said apparatus comprising:

detection means, associated with said video equipment, for detecting use of said video equipment; and means for transmitting said detected data to a central computer for evaluation;

wherein said detection means comprises a video module operatively connected to said video recording and video reproducing means through a bidirectional amplifier for recording data characterizing programs on a synchronization track of a recording medium during recording of said video programs and for reading said characterizing data during reproduction of said programs to obtain information relating to the use of video equipment by a test population;

wherein said characterizing data is recorded between synchronization pulses of said synchronization track; and wherein said bi-directional amplifier is capable of distinguishing between a recording mode and a reading mode.

8. An apparatus according to claim 7 wherein said video module comprises a circuit for detecting the level of received signals and for outputting data corresponding to said detected level to indicate a recording or reproducing condition of said video recording and reproducing means based on said detected level means.

9. An apparatus according to claim 7 wherein said central computer comprises means for evaluating the video reproduction data and for transmitting interrogations to a user;

said video viewing means comprising display means for displaying said interrogations and input means for enabling responses to said interrogations to be transmitted to said central computer.

10. In an apparatus for obtaining information relating to the video viewing habits of a test population, a device allowing the monitoring of information by a central computer of a television signal being viewed or recorded and video programs or text being viewed, said device comprising:

- means for determining if a video cassette player/recorder is in a record mode or a reproducing mode;
- means for writing characterization data of a program being recorded onto a synchronization track of a video cassette if the video cassette player/recorder is in a recording mode;
- means for reading characterization data from the synchronization track of a video cassette if the video cassette player/recorder is in a reproduction mode;
- switch means responsive to said means for determining for changing over from a record mode to a play mode, said switch means being selectively connectable to an input of said means for writing characterization data and said means for reading characterization data; and
- means for sending characterization data read from a video cassette to a control computer to determine the viewing habits of a test population.

* * * * *